United States Patent [19]

Craft et al.

[11] 4,288,561

[45] Sep. 8, 1981

[54] FOAMABLE POLYESTER COMPOSITION

[75] Inventors: Donald I. Craft; Morton Kramer, both of Pittsfield, Mass.

[73] Assignee: General Electric Company, Pittsfield, Mass.

[21] Appl. No.: 880,076

[22] Filed: Feb. 22, 1978

Related U.S. Application Data

[63] Continuation of Ser. No. 486,214, Jul. 5, 1974, abandoned.

[51] Int. Cl.³ ............................................. C08J 9/10
[52] U.S. Cl. ........................... 521/90; 260/40 R; 260/40 P; 260/45.7 P; 260/DIG. 24; 521/79; 521/91; 521/92; 521/93; 521/95; 521/182; 521/907
[58] Field of Search ............... 260/2.5 N; 521/182, 521/95, 143, 90

[56] References Cited

U.S. PATENT DOCUMENTS

| | | | |
|---|---|---|---|
| 3,211,678 | 10/1965 | Robinson | 260/2.5 N |
| 3,235,519 | 2/1966 | Hunter | 521/143 |
| 3,474,048 | 10/1969 | Chappelear et al. | 260/2.5 HA |
| 3,502,754 | 3/1970 | Fehn | 521/143 |
| 3,634,564 | 1/1972 | Okamoto et al. | 521/143 |
| 3,671,487 | 6/1972 | Abolins | 260/40 R |
| 3,725,321 | 4/1973 | Wirth et al. | 260/2.5 R |
| 3,873,477 | 3/1975 | Beck et al. | 521/95 |
| 3,950,484 | 4/1976 | Elgi | 521/143 |
| 3,962,154 | 6/1976 | Elgi | 521/143 |
| 4,097,421 | 6/1978 | Chang | 521/182 |

OTHER PUBLICATIONS

Bennett et al., Reinforcement of Foam Rubber, *Rubber World*, Sep., 1950, pp. 72, 673 & 720.

*Primary Examiner*—Morton Foelak
*Attorney, Agent, or Firm*—William F. Mufatti

[57] ABSTRACT

A foamable thermoplastic injection moldable composition comprising in admixture (a) a polyester resin, (b) a filler selected from the group consisting of fibrous glass or a mineral or mixtures thereof in an amount of from about 5 to about 50 weight percent and (c) a minor amount of a foaming agent. The compositions can also include flame retardant additives.

18 Claims, No Drawings

FOAMABLE POLYESTER COMPOSITION

This is a continuation, of application Ser. No. 486,214, filed July 5, 1974, now abandoned.

This invention relates to a foamable flame-retardant thermoplastic injection moldable composition comprising in admixture (a) a polyester resin, (b) a filler selected from the group consisting of fibrous glass and a mineral or mixtures thereof in an amount of from about 5 to about 50 weight percent and (c) a minor amount of a foaming agent.

BACKGROUND OF THE INVENTION

High molecular weight linear polyesters and copolyesters of glycols and terephthalic or isophthalic acid have been available for a number of years. These are described inter alia in Whinfield et al., U.S. Pat. No. 2,465,319 and in Pengilly U.S. Pat. No. 3,047,539. These patents disclose that the polyesters are particularly advantageous as film and fiber formers.

From U.S. Pat. Nos. 3,304,282; 3,396,142; 3,408,225; 3,437,632; 3,671,487 and 3,678,079, it is known to prepare glass fiber reinforced thermoplastics.

Also, it is known to add a foaming agent to thermoplastics as disclosed in U.S. Pat. Nos. 2,964,794; 3,268,636; 3,277,029; 3,290,261; 3,377,296; 3,436,446; 3,442,829 and British Pat. No. 838,824. Additionally, U.S. Pat. No. 3,334,154 discloses a polymer composition employing a flame-retardant additive comprising a copolymer. However, none of these references discloses a composition comprising a polyester, a filler selected from the group consisting of fibrous glass and a mineral or mixtures thereof, and a minor amount of a foaming agent.

It has been discovered that the instant flame-retardant injection moldable composition comprising in admixture: (a) a polyester resin, (b) a filler selected from the group consisting of fibrous glass or a mineral or mixtures thereof in an amount of from about 5 to about 50 weight percent and (c) a minor amount of a foaming agent, provides polyester products which have uniform cell structure, smooth surfaces, high impact, modulus and tensile strength. Also, the composition of this invention may contain a flame retardant which provides the composition with an SE-O rating in UL's Vertical Burning Test for Classifying Materials.

When foaming agent is added directly to a polyester, highly irregular foaming occurs which results in an inferior product. However, when the foaming agent is added to a polyester containing a filler such as fibrous glass or a mineral or mixtures thereof, and a flame retardant additive in an amount of at least 5 weight percent, a foamed product is produced having a rigid cellular core within a solid integral skin having the outstanding properties listed above.

The composition of the instant invention is injection molded in a standard injection molding machine or any thermoplastic foam molding machine available to produce a variety of foam molded products.

DESCRIPTION OF THE INVENTION

This invention is directed to a foamable thermoplastic injection moldable composition comprising in admixture: (a) a poly(1,4-butylene terephthalate) resin or copolyesters thereof; (b) a filler selected from the group consisting of fibrous glass or a mineral or mixtures thereof in an amount of from about 5 to about 50 weight percent and (c) a minor amount of a foaming agent.

Another feature of this invention is to provide a foamable thermoplastic injection moldable composition comprising in admixture: (a) a poly (1,4-butylene terephthalate) resin of copolyester thereof; (b) a filler selected from the group consisting of fibrous glass or a mineral or mixtures thereof in an amount of from about 5 to about 50 weight percent; (c) a flameretardant additive in minor proportion but in an amount sufficient to render the polyester resin non-burning or self-extinguishing and (d) a minor amount of a foaming agent.

The poly(butylene terephthalate) resin of the instant invention has repeating units of the general formula

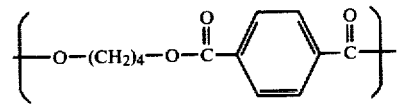

Also contemplated are mixtures of the above resins with minor amounts, e.g., from 0.5 to 20% by weight, of units derived from aliphatic or aromatic dicarboxylic acids and/or aliphatic polyols, e.g., glycols, i.e., copolyesters. These can also be made following the teachings of the Pengilly and Whinfield et al. patents above mentioned, suitably modified, if necessary.

Among the units which can be present in the copolyesters are those derived from aliphatic dicarboxylic acids, e.g., of up to about 50 carbon atoms, including cycloaliphatic, straight and branched chain acids, such as adipic acid, cyclohexanediacetic acid, dimerized $C_{16}-C_{18}$ unsaturated acids (which have 32 to 36 carbon atoms), trimerized such acids, and the like. Among the units in the copolyesters can also be minor amounts derived from aromatic dicarboxylic acids, e.g., of up to about 36 carbon atoms, such as isophathalic acid and the like. In addition to the 1,4-butylene glycol units, there can also be minor amounts of units derived from other aliphatic glycols and polyols, e.g., of up to about 50 carbon atoms, including glycerol, cyclohexanediol, and the like. Also included are the units derived from $HO+CH_2CH_2O)_nH$ wherein n is 7 to about 50.

The poly(1,4-butylene terephthalate) will have an intrinsic viscosity of at least 0.2 and preferably about 1.0 deciliters/gram as measured in o-chlorophenol, a 60/40 phenol-tetrachloroethane mixture or a similar solvent at 25°–30° C. The upper limit is not critical, but it will generally be about 2.5 dl./g. Especially preferred polyesters will have an intrinsic viscosity in the range of 0.5 to 1.3.

The poly(butylene terephthalate) resin of the instant invention may also be branched.

The branching component used in the polyesters will contain at least three ester forming groups. It can be one which provides branching in the acid unit portion of the polyester, or in the glycol unit portion, or be a hybrid. Illustrative such branching components are tri or tetracarboxylic acids, such as trimesic acid, pyromellitic acid and lower alkyl esters thereof, and the like, or, preferably, polyols, and especially preferably tetrols, such as pentaerythritol, triols, such as trimethylolpropane, or dihydroxy carboxylic acids and hydroxydicarboxylic acid and derivatives, such as dimethyl hydroxy-terephthalate, and the like.

The relative amount of the branching component used in the reaction mixture can vary, but is always preferably kept at a minor proportion, e.g., of up to 5 mol % maximum, for every 100 moles of the terephthalate units in the branched polyester. Preferably, the range of branching component included in the esterification mixture (and, generally, that included in the product), will be from 0.05 to 3 mole % based on the terephthalate units. Especially preferably, it will comprise from about 0.1 to about 1 mole %, based on the terephthalate component.

In general, it is convenient to add small amounts of the branching components to the terephthalic acid or ester and an excess of the alkylene glycol in the presence of a conventional polyester catalyst then to heat to form a prepolymer and finally to heat under a high vacuum until the desired degree of polymerization is reached.

The molecular weight of the branched polyester should be sufficiently high to provide an intrinsic viscosity of about 0.6 to 1.0 deciliters per gram, and preferably 0.7 to 1.6 dl./g., measured for example, as a solution in a 60:40 mixture of phenol and tetrachloroethane at 30° C.

The flame-retardant additives useful in this invention comprise a family of chemical compounds well known to those skilled in the art. Generally speaking, the more important of these compounds contain chemical elements employed for their ability to impart flame resistance, e.g., bromine, chlorine, antimony, phophorus and nitrogen. It is preferred that the flame-retardant additive comprise a halogenated organic compound (brominated or chlorinated); a halogen-containing organic compound in admixture with an organic or inorganic antimony compound, e.g., antimony oxide; elemental phosphorus or a phosphorus compound; a halogen-containing compound in admixture with a phosphorus compound or compounds containing phosphorus-nitrogen bonds or a mixture of two or more of the foregoing.

The amount of flame-retardant additive used is not critical to the invention, so long as it is present in a minor proportion based on said composition—major proportions will detract from physical properties. Those skilled in the art are well aware that the amount will vary with the nature of the polymers in the blend and with the efficiency of the additive. In general, however, the amount of additive will be from 0.5 to 50 parts by weight per hundred parts of resin. A preferred range will be from about 3 to 25 parts and an especially preferred range will be from about 5 to 15 parts of additive per 100 parts of resin. Smaller amounts of compounds highly concentrated in the elements responsible for flame-retardance will be sufficient, e.g., elemental red phosphorus will be preferred at 0.5 to 10 parts by weight per hundred parts of resin while phosphorus in the form of triphenyl phosphate will be used at 5 to 25 parts of phosphate per part of resin and so forth. Halogenated aromatics will be used at 2 to 20 parts and synergists, e.g., inorganic or organic antimony compounds, such as antimony oxide, will be used at about 1 to 10 parts by weight per 100 parts of resin.

Among the useful halogen-containing compounds are those of the formula

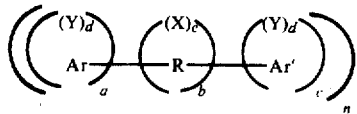

wherein n is 1 to 10 and R is an alkylene, alkylidene or cycloaliphatic linkage, e.g., methylene, ethylene, propylene, isopropylene, isopropylidene, butylene, isobutylene, amylene, cyclohexylene, cyclopentylidene, and the like: a linkage selected from the group consisting of ether; carbonyl; a sulfur-containing linkage, e.g., sulfide, sulfoxide, sulfone, thiocarbonate; a phosphorus-containing linkage, and the like. R can also consist of two or more alkylene or alkylidene linkages connected by such groups as aromatic, ether, ester, carbonyl, sulfide, sulfoxide, sulfone, a phosphorus-containing linkage, and the like. R can be derived from a dihydric phenol, e.g., bisphenol-A and the like. Other groups which are represented by R will occur to those skilled in the art.

Ar and Ar' are mono- or polycarbocyclic aromatic groups such as phenylene, biphenylene, terphenylene, naphthylene, and the like. Ar and Ar' may be the same or different.

Y is a substituent selected from the group consisting of organic, inorganic or organometallic radicals. The substituents represented by Y include (1) halogen, e.g., chlorine, bromine, iodine, or fluorine or (2) bydroxy or ether groups of the general formula OE, wherein E is hydrogen or a monovalent hydrocarbon radical similar to X or (3) monovalent hydrocarbon groups of the type represented by R or (4) other substituents, e.g., cyano, etc., said substituents being essentially inert provided there be at least one and preferably two halogen atoms per aryl, e.g., phenyl, nucleus.

X is a monovalent hydrocarbon group exemplified by the following: alkyl, such as methyl, ethyl, propyl, isopropyl, butyl, decyl, and the like; aryl groups, such as phenyl, naphthyl, biphenyl, xylyl, tolyl, and the like; aralkyl groups, such as benzyl, ethylphenyl, and the like; cycloaliphatic groups, such as cyclopentyl, cyclohexyl, and the like; as well as monovalent hydrocarbon groups containing inert substituents therein. It will be understood that where more than one X is used they may be alike or different.

The letter d represents a whole number ranging from 1 to a maximum equivalent to the number of replaceable hydrogens substituted on the aromatic rings comprising Ar or Ar'. The letter e represents a whole number ranging from 0 to a maximum controlled by the number of replaceable hydrogens on R. The letters a, b, and c represent whole numbers including 0. When b is not 0, neither a nor c may be 0. Otherwise either a or c, but not both, may be 0. Where b is 0, the aromatic groups are joined by a direct carbon-to-carbon bond.

The Y substituents on the aromatic groups, Ar and Ar' can be varied in the ortho, meta or para positions on the aromatic rings and the groups can be in any possible geometric relationship with respect to one another.

Included within the scope of the bisphenols included in the above formula are the following:
2,2-bis (4-hydroxy, 3,5-dichlorophenyl)propane
bis (4-hydroxy, 3-chlorophenyl)methane
bis (4-hydroxy, 3,5-dibromophenyl)methane
1,2-bis (4-hydroxy, 3,5-dichlorophenyl)ethane
1,1-bis (4-hydroxy, 3,5-dichlorophenyl)ethane
3,3-bis (4-hydroxy, 3,5-dichlorophenyl)pentane
bis (4-hydroxy, 3,5-dichlorophenyl)cyclohexylmethane The preparation of these and other applicable bisphenols are known in the art. In place of the divalent aliphatic group in the above examples may be substituted sulfide, sulfoxy and the like.

Included within the above structural formula are substituted benzenes exemplified by tetrabromobenzene, hexachlorobenzene, hexabromobenzene, and biphenyls such as 2,2'-dichlorobiphenyl, 2,4'-dibromobiphenyl, 2,4'-dichlorobiphenyl, hexabromobiphenyl, octabromobiphenyl, decabromibiphenyl and halogenated diphenyl ethers, containing 2 to 10 halogen atoms.

Preferred halogen compounds for this invention are aromatic halogen compounds such as chlorinated benzenes, brominated benzenes, chlorinated biphenyls, chlorinated terphenyls, brominated biphenyls, brominated biphenols, brominated terphenyls or compounds comprising two phenyl radicals separated by a divalent alkylene group and having at least two chlorine or bromine atoms per phenyl nucleus, and mixtures of at least two of the foregoing. Halogenated bis-imides are also useful.

Especially preferred are hexabromobenzene and chlorinated biphenyls or terphenyls, alone or mixed with antimony oxide.

In general, the preferred phosphate compounds are selected from elemental phosphorus or organic phosphonic acids, phosphonates, phosphinates, phosphonites, phosphinites, phosphene oxides, phosphenes, phosphites or phosphates. Illustrative is triphenyl phosphine oxide. These can be used alone or mixed with hexabromobenzene or a chlorinated biphenyl and, optionally, antimony oxide.

Typical of the preferred phosphorus compounds to be employed in this invention would be those having the general formula

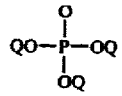

and nitrogen analogs thereof where each Q represents the same or different radicals including hydrocarbon radicals such as alkyl, cycloalkyl, aryl, alkyl substituted aryl and aryl substituted alkyl; halogen; hydrogen and combinations thereof provided that at least one of said Q's is aryl. Typical examples of suitable phosphates include, phenylbisdodecyl phosphate, phenylbisneopentyl phosphate, phenylethylene hydrogen phosphate, phenylbis (3,5,5'-trimethylhexyl phosphate), ethyldiphenyl phosphate, 2-ethylhexyl di(p-tolyl) phosphate, diphenyl hydrogen phosphate, bis (2-ethylhexyl) p-tolyphosphate, tritolyl phosphate, bis (2-ethylhexyl)-phenyl phosphate, tri(nonylphenyl)phosphate, phenylmethyl hydrogen phosphate, di(dodecyl) p-tolyl phosphate, tricresyl phosphate, triphenyl phosphate, halogenated triphenyl phosphate, dibutylphenyl phosphate, 2-chloroethyldiphenyl phosphate, p-tolyl bis (2,5,5'-trimethylhexyl)phosphate, 2-ethylhexyldiphenyl phosphate, diphenyl hydrogen phosphate, and the like. The preferred phosphates are those where each Q is aryl. The most preferred phosphate is triphenyl phosphate. It is also preferred to use triphenyl phosphate in combination with hexabromobenzene and, optionally, antimony oxide.

Also suitable as flame-retardant additives for this invention are compounds containing phosphorus-nitrogen bonds, such as phosphonitrilic chloride, phosphorus ester amides, phosphoric acid amides, phosphonic acid amides, phosphinic acid amides, tris(aziridinyl)phosphine oxide or tetrakis (hydroxymethyl)phosphonium chloride. These flame-retardant additives are commercially available.

A preferred flame-retardant additive of this invention is a copolycarbonate which is derived from a halogen-substituted dihydric phenol and a dihydric phenol, said halogen preferably being chlorine or bromine. Preferably, this copolycarbonate is the product of a halogenated bisphenol-A such as tetrabromobisphenol-A and tetrachlorobisphenol-A and a dihydric phenol such as bisphenol-A. Preferably, this copolycarbonate consists of 75 to 25 weight percent of the product of tetrabromobisphenol-A and, correspondingly, 25 to 75 weight percent of the product of bisphenol-A, based on the weight of the copolycarbonate. The preparation of this copolycarbonate is set forth in U.S. Pat. No. 3,334,154 which is incorporated herein by reference.

Particularly preferred flame-retardant additives for use in this invention are low molecular weight polymers of a carbonate of a halogenated dihydric phenol. Preferred such polymers contain from 2 to 10 repeating units of the formula

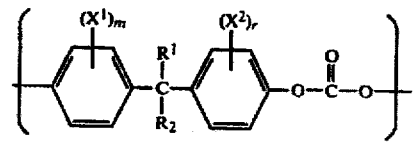

wherein $R^1$ and $R^2$ are hydrogen, (lower)alkyl or phenyl, $X^1$ and $X^2$ are bromo or chloro and m and r are from 1 to 4. The polymeric additives will have a low volatility when heated above 200° C., and a softening point of less than about 300° C. They will be used alone or in combination with synergists, such as inorganic or organic antimony-containing compounds.

These polymeric additives can be made by polymerizing a mixture of a halogenated dihydric phenol and a chain stopper, e.g., an alcohol, carboxylic acid, carboxylic acid halide or, preferably a monohydric phenol, and most preferably a halogenated phenol and phosgene or a reactive derivative thereof in the presence of an acid acceptor, e.g., an amine or caustic. Details concerning the preparation and use of such compounds are given in the copending patent application of Daniel W. Fox, "Flame Retardant Compounds and Thermoplastic Compositions Containing the Same" Ser. No. 194,518, filed on Nov. 1, 1971 and incorporated herein by reference.

The most preferred such additive can be made by polymerizing a mixture of tetrabromobisphenol-A and 2,4,6'tribromophenol with phosgene in either methylene chloride in the presence of pyridine or in methylene chloride containing triethylamine in admixture with an aqueous caustic phase. The product of such a process will be a polymer of the formula:

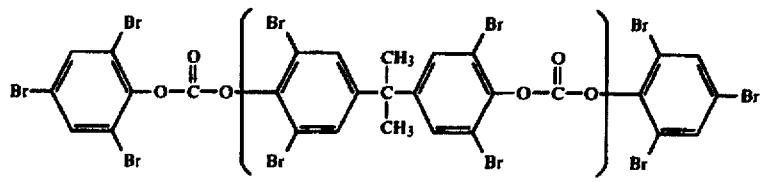

wherein the average number of repeating units, n, will be from about 3 to about 7, and the softening point will be in the range of from 200° to 260° C.

The preferred polymeric additives can be used within the concentration ranges specified above for halogenated compounds in general, but preferably will be used in amounts of from about 5 to about 25 parts by weight per 100 parts by weight of the flammable polyester resinous components in the composition.

Inorganic and organic antimony compounds are widely available or can be made in known ways. In preferred embodiments, the type of antimony compound used is not critical, being a choice primarily based on economics. For example, as inorganic antimony compounds there can be used antimony oxide, ($Sb_2O_3$); antimony phosphate; $KSb(OH)_6$; $NH_4SbF_6$; $SbS_3$; and the like. A wide variety of organic antimony compounds can also be used, such as antimony esters with organic acids; cyclic alkyl antimonites; aryl antimonic acids, and the like. Illustrative of the organic antimony compounds, including inorganic salts of such compounds are: KSb tartrate, Sb caproate; $Sb(OCH_2CH_3)$; $Sb(OCH(CH_3)CH_2CH_3)_3$; Sb polymethylene glycolate; triphenyl antimony; and the like. Especially preferred is antimony oxide.

The filler consisting of fibrous glass or a mineral or mixtures thereof employed in the present composition is well known to those skilled in the art. By fibrous glass materials, it is understood that glass silk, as well as all glass fiber materials derived therefrom including glass fiber fabrics, rovings, staple fibers and glass fiber mats are included. The length of the glass filaments and whether or not they are bundled into fibers and the fibers bundled in turn to yarns, ropes or rovings, or woven into mats, and the like, are also not critical to the invention. However, when using fibrous glass filaments, they may first be formed and gathered into a bundle known as a strand. In order to bind the filaments into a strand so that the strand can be handled, a binder or binding agent is applied to the glass filaments. Subsequently, the strand can be chopped into various lengths as desired. It is convenient to use the strands in lengths of from about ⅛" to about 1" long, preferably ⅜" or less in length. These are called chopped strands. Some of these binding agents are polymers such as polyvinyl acetate, particular polyester resins, polycarbonates, starch, acrylic melamine, polyvinyl chloride, polyethylene oxide or polyvinyl alcohol. Also, the filler may be a mineral such as synthetic or naturally occurring silicates. Aluminum silicate, talc, asbestos, Wollastonite, etc. are preferred minerals. A preferred form of the mineral is a finely divided powder. The filler may also comprise mixtures of glass and a mineral. Any suitable method of incorporating the filler with the polyester resin can be used as blending chopped glass strands with the polyester resin so that glass fibers are uniformly dispersed therein. Preferably, the polyester resin contains from about 5 to about 50 weight percent of the filler based on the weight of the resin.

The foaming agents of the present invention can be selected from chemicals containing decomposable groups such as azo, N-nitroso, carboxylate, carbonate, heterocyclic nitrogen containing and sulfonyl hydrazide groups. Representative compounds include azodicarbonamide, dinitrosopentamethylene tetramine, p,p'-oxy-bis-(benzensulfonyl)-hydrazide, benzene-1,3-disulfonyl hydrazide, azo-bis-(-isobutyionitrile), biuret and urea. The foaming agent can also consist of normally gaseous agents such as gaseous fluorocarbons as well as gases such as nitrogen, carbon dioxide, air, helium, argon and krypton. Volatile liquids such as pentane, and liquid fluorocarbons may also be employed in the foaming of the polymer. The foaming agent may be added to the polymer in several different ways which are known to those skilled in the art, for example, by adding liquid or gaseous agents directly to the resin in the extruder while the resin is in the molten state to obtain uniform dispersal of the agent in the molten plastic. The temperature and pressures to which the foamable composition of the invention are subjected to provide a foamed polyester will vary within a wide range, depending upon the amount and type of foaming agent that is used. The foaming agent may be used in amounts of from about 0.02 to about 5.0 weight percent and preferably from about 0.02 to about 2.0 weight percent based on weight of the resin. The preferred foaming agents are dinitrosopentamethylene tetramine, p-toluene sulfonyl semicarbazide, 5-phenyl-tetrazole, calcium oxalate and trihydrazinos-triazine.

The polyester resin may be prepared by any of the well-known methods outlined above. The filler and flame retardant may be blended with the resin at room temperature. The blend consisting of the polyester resin, flame retardant and the filler is fed into an extruder at a temperature of 480° F. to about 550° F. The extrudate is then comminuted into pellets or other suitable shapes. If a decomposable chemical foaming agent is used, it can be dry tumbled with the resin. This mixture is then fed into a conventional molding machine. The molding temperature may be from about 450° F. to about 580° F. with the mold temperature being from about 100° F. to 250° F., preferably from about 140° F. to about 200° F.

If the foaming agent is a liquid or gaseous agent, it may be added directly to the molten resin to obtain uniform dispersal of the agent in the Molten resin and thereafter may be injected into a mold to produce a foam molded product.

The foamable composition may be handled in any conventional manner employed for the fabrication or manipulation of polyesters such as low and high pressure injection molding to provide polyester products which have uniform cell structure, smooth surfaces, high impact, modulus and tensile strength, flame resistance, improved flow and cycle time.

The composition may contain additional materials such as pigments and dyes, stabilizers, plasticizers, antioxidants, mold-release agents, ultraviolet stabilizers, and the like.

DESCRIPTION OF THE PREFERRED EMBODIMENT

The following examples are set forth herein to illustrate in more detail the preferred embodiments and to illustrate more clearly the principle and practice of this invention to those skilled in the art. Unless otherwise specified, where parts or percents are mentioned, they are parts or percents by weight.

EXAMPLE 1

Approximately fifty-five parts by weight of poly(butylene terephthalate) having an intrinsic viscosity ranging from 0.73 dl/g. and a melting point of 435° F. is blended at ambient temperature with 25 parts by weight of chopped glass strands ⅛" long and thirteen parts by weight of a carbonate copolymer of a 1:1 bisphenol and tetrabromo bisphenol-A and five parts by weight of antimony oxide. This blend is then extruded at a temperature of 500° F. The extrudate is then chopped into pellet form. Pellets are then dried for about 2-4 hours at 250° F. then tumble blended with 0.2 parts by weight of 5-phenyl tetrazole foaming agent. This composite of pellets and foaming agent was then injection molded on standard injection molding machine with a melt temperature range of 500°-550° F. into ASTM type test bars having a specific gravity of 1.42 (Sample A) and 1.27 (Sample B). Specific gravity differences were obtained by controlling the quantity of the foamed composition injected into the mold cavity.

The test bars of the Examples are tested for one or more of the following physical properties: tensile strength and elongation, ASTM D-1708; flexural strength and modulus, ASTM D-790; unnotched impact strength. Additionally, where flame retardant additive was added, the test bar is evaluated in accordance with the test procedure of Underwriters' Laboratories, Inc., Standard UL-94, September, 1972, Vertical Burning Test for Classifying Materials. In accordance with the test procedure, materials are classified as either SE-O, SE-I, or SE-II. The results are based on 5 specimens, each supported vertically. The criteria for SE rating per UL-94 is briefly as follows:

"SE-O":
 Average flaming and/or glowing after removal of the igniting flame shall not exceed 5 seconds and none of the specimens burn for longer than 10 seconds nor shall drip flaming particles which ignite absorbent cotton that is placed 12 inches below the specimen.

"SE-I":
 Average flaming and/or glowing after removal of the igniting flame shall not exceed 25 seconds and no one sample shall exceed 30 seconds nor shall the specimen drip flaming particles that ignite absorbent cotton that is placed 12 inches below the specimen.

"SE-II":
 Average flaming and/or glowing after removal of the igniting flame shall not exceed 25 seconds and no one sample shall exceed 30 seconds but the specimens may drip flaming particles which ignite absorbent cotton.

Further, UL-94 states that if only one specimen from a set of five specimens fails to comply with the requirements, another set of five specimens shall be tested. All specimens from this second set shall comply with the appropriate requirements in order for the material in that thickness to be classified "SE-0" "SE-1" or "SE-2". The results are set out in the TABLES.

TABLE I

| Properties | Sample A | Sample B |
|---|---|---|
| Specific Gravity | 1.42 | 1.27 |
| Tensile Strength, psi | 11,820 | 9,920 |
| Tensile Elongation @ Break, % | 1.4 | 1.3 |
| Flexural Strength, psi | 19,950 | 17,890 |
| Flexural Modulus, psi | 1,120,000 | 1,030,000 |
| Unnotched Impact Strength, ft.-lbs./in. | 12 | 11 |
| Flammability, UL-94 Rating @ 1/16" Thickness | SE-0 | SE-0 |

EXAMPLE 2

Sixty-six and eight tenths (66.8) parts by weight of poly(butylene terephthalate) resin of Example 1 is blended with 33 parts by weight of chopped glass strands ⅛" long. The blend was extruded and chopped into pellets. The pellets are dried 2-4 hours at 250° F. and tumble blended with 0.2 parts by weight of 5 phenyl tetrazole foaming agent as in Example 1. ASTM test bars were molded with specific gravity of 1.37 (Sample C), 1.21 (Sample D), 1.14 (Sample E) and 1.05 (Sample F). The properties obtained are set out in Table II.

TABLE II

| Properties | Sample C | Sample D | Sample E | Sample F |
|---|---|---|---|---|
| Specific Gravity | 1.37 | 1.21 | 1.14 | 1.05 |
| Tensile Strength, psi | 12,100 | 9,950 | 9,590 | 9,200 |
| Tensile Elongation @ Break, % | 2.6 | 2.4 | 2.3 | 2.2 |
| Flexural Strength, psi | 21,410 | 18,502 | 17,430 | 16,390 |
| Flexural Modulus, psi | 1,020,000 | 927,000 | 850,000 | 798,000 |
| Unnotched Impact Strength, ft-lbs./in. | 11.8 | 10.1 | 9.9 | 9.1 |

EXAMPLE 3

Ninety-four (94) parts by weight of poly(butylene terephthalate) resin of Example 1 is blended with five (5) parts by weight of chopped glass strands ⅛" long. This blend is extruded into pellets, dried and blended with foaming agent and molded by the procedure of Example 1 into ASTM type test bars of specific gravity 1.22 (Sample G) and 1.06 (Sample H). The properties obtained are set out in TABLE III.

TABLE III

| Properties | Sample G | Sample H |
|---|---|---|
| Specific Gravity | 1.22 | 1.06 |
| Tensile Strength, psi | 8,720 | 8,500 |
| Tensile Elongation, @ Break, % | 11.2 | 8.7 |
| Flexural Strength, psi | 16,230 | 14,410 |
| Flexural Modulus, psi | 455,000 | 420,000 |
| Unnotched Impact Strength, ft.-lbs./in. | .8 | .65 |

EXAMPLE 4

The poly(butylene terephthalate), flame retardant polymer and antimony oxide of Example 1 is fed into an extruder and the extrudate comminuted into pellets. The pellets were dried at 250° F. for about four hours and then tumble blended with 0.2 parts by weight of 5-phenyltetrazole foaming agent. This composition is then injection molded at 550° F., in a standard injection molding machine. The procedure of this Example was repeated and only the injection molding temperature was changed. The foam is unevenly distributed throughout the test piece. The test pieces are badly warped and irregularly foamed with large voids and sink marks so that meaningful and consistent test data are impossible to obtain. Also, it was not possible to foam the specimens over a range of specific gravity.

EXAMPLE 5

The poly(butylene terephthalate) of Example 2 is fed into an extruder and the extrudate comminuted into pellets. The pellets are dried, blended with a foaming agent and injection molded as in Example 4. The results were the same as in Example 4.

As seen in Example 4 and 5, foaming agent added to resin and resin, flame retardant polymer and antimony oxide does not produce an acceptable foamed product. The test pieces are badly warped and irregularly foamed with large voids and sink marks so that meaningful and consistent test data were impossible to obtain. However, the composition of the present invention, as seen in Examples 1 through 3, and TABLE I through TABLE III, produces a foamed product exhibiting high tensile strength, flexural strength, flexural modulus, impact strength and SE-0 rating where a flame retardant is used. Additionally, products produced from the instant composition exhibit greater rigidity than unfoamed products of the same weight. The combination of these mechanical properties with rigidity provides higher strength-to-weight ratios than metal.

Obviously, other modifications and variations of the present invention are possible in the light of the above teachings. It is, therefore, to be understood that changes may be made in the particular embodiments of this invention described which are within the full intended scope of the invention as defined by the appended claims.

What is claimed is:

1. A foamable thermoplastic injection moldable composition consisting of in admixture: (a) a poly(1,4-butylene terephthalate) resin or copolyesters thereof; (b) a filler selected from the group consisting of fibrous glass or a mineral or mixtures thereof in an amount of from about 5 to about 50 weight percent; and, (c) a foaming agent in amounts of from about 0.02 to about 5.0 weight percent based on the weight of the resin selected from the group consisting of dinitrosopentamethylene tetramine, p-toluene sulfonyl semicarbazide, 5-phenyltetrazole, calcium oxalate and trihydrazino-s-triazine.

2. The composition as defined in claim 1 wherein said polyester is poly(1,4-butylene terephthalate).

3. The composition as defined in claim 1 wherein the polyester resin contains units providing branching sites and derived from compounds containing at least three ester forming groups.

4. The composition as defined in claim 1 wherein the fibrous glass filler comprises finely divided fibrous glass filaments.

5. The composition as defined in claim 1 wherein the mineral filler is talc.

6. The composition as defined in claim 1 wherein the mineral filler is asbestos.

7. The composition as defined in claim 1 wherein the mineral filler is Wollastonite.

8. The composition as defined in claim 1 wherein the foaming agent is present in the amount of from about 0.02 to about 2.0 weight percent based on the weight of resin.

9. A flame retardant foamable thermoplastic composition consisting of in admixture:
(a) a poly(1,4-butylene terephthalate) resin or copolyester thereof;
(b) a filler selected from the group consisting of fibrous glass or a mineral or mixtures thereof in an amount of from about 5 to about 50 weight percent;
(c) a foaming agent in amounts of from about 0.02 to about 5.0 weight percent based on the weight of the resin selected from the group consisting of dinitrosopentamethylene tetramine, p-toluene sulfonyl semicarbazide, 5-phenyltetrazole, calcium oxalate and trihydrazino-s-triazine; and,
(d) a flame retardant additive in a minor proportion but in an amount at least sufficient to render the polyester resin flame retardant, said flame retardant additive selected from the group consisting of (1) a low molecular weight polymer of a carbonate of a halogenated dihydric phenol, (2) a copolycarbonate of a halogen substituted dihydric phenol and a dihydric phenol, (3) a halogen-containing compound, (4) mixtures of either (1), (2) or (3) above with antimony oxide, (5) elemental phosphorus or a phosphorus compound, (6) a halogen-containing compound in admixture with a phosphorus compound, and (7) a compound containing phosphorus-nitrogen bonds.

10. A composition as defined in claim 9 wherein said flame retardant additive is selected from the group consisting of elemental phosphorus; organic phosphonic acids, phosphonates, phosphinates, phosphonites, phosphinites, phosphine oxides, phosphines, phosphites, phosphates and mixtures of any of the foregoing.

11. A flame retardant composition as defined in claim 9 wherein said flame retardant additive is either
(a) a low molecular weight polymer of a carbonate of a halogenated dihydric phenol, said polymer containing from 2 to 10 repeating units of the formula

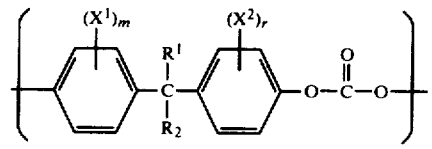

wherein $R^1$ and $R^2$ are hydrogen, (lower) alkyl or phenyl, $X^1$ an $X^2$ are bromo or chloro and m and r are from 1 to 4, said polymer having low volatility when heated above about 200° C., and a softening point of less than about 300° C., or
(b) a combination of said polymer (a) and antimony oxide.

12. A flame retardant composition as defined in claim 11 wherein said low molecular weight polymer (a) is of the formula

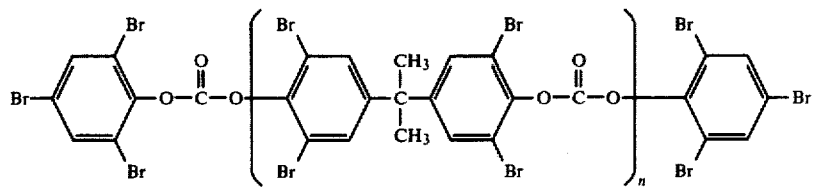

wherein the average number of repeating units, n, is from about 3 to 7, and the softening point of said polymer is in the range of from 200° to 260° C.

13. A flame retardant composition as defined in claim 9 wherein said flame retardant additive is either
  (a) a copolycarbonate which is the reaction product of a halogen substituted dihydric phenol and a dihydric phenol or
  (b) a combination of said polymer (a) and antimony oxide.

14. A flame retardant composition as defined in claim 13 wherein said copolycarbonate is the reaction product of a halogenated bisphenol-A and a dihydric phenol.

15. The composition as defined in claim 9 wherein the fibrous glass filler comprises finely divided fibrous glass filaments.

16. The composition as defined in claim 9 wherein the mineral filler is talc.

17. The composition as defined in claim 9 wherein the mineral filler is asbestos.

18. The composition as defined in claim 9 wherein the mineral filler is Wollastonite.

* * * * *